United States Patent
Wang et al.

(10) Patent No.: US 12,379,589 B2
(45) Date of Patent: Aug. 5, 2025

(54) METHOD AND DEVICE FOR GENERATING AIRY LIGHT NEEDLE WITH LONG DEPTH OF FOCUS AND HIGH ASPECT RATIO

(71) Applicant: Zhejiang University, Hangzhou (CN)

(72) Inventors: Ligang Wang, Hangzhou (CN); Lai Chen, Hangzhou (CN)

(*) Notice: Subject to any disclaimer, the term of this patent is extended or adjusted under 35 U.S.C. 154(b) by 54 days.

(21) Appl. No.: 18/539,167

(22) Filed: Dec. 13, 2023

(65) Prior Publication Data

US 2024/0201484 A1  Jun. 20, 2024

(30) Foreign Application Priority Data

Dec. 19, 2022 (CN) .......................... 202211634135.4

(51) Int. Cl.
*G02B 27/00* (2006.01)
*G02B 27/09* (2006.01)
(Continued)

(52) U.S. Cl.
CPC ..... *G02B 27/0012* (2013.01); *G02B 27/0075* (2013.01); *G02B 27/0916* (2013.01);
(Continued)

(58) Field of Classification Search
CPC ............ G02B 27/0012; G02B 27/0075; G02B 27/0916; G02B 27/0927; G02B 27/0944;
(Continued)

(56) References Cited

U.S. PATENT DOCUMENTS 8,101,929 B1   1/2012  Christodoulides et al.
10,688,599 B2* 6/2020  Liu ..................... B23K 26/0617

FOREIGN PATENT DOCUMENTS

CN   111736334 A   10/2020
CN   112964375 A    6/2021
(Continued)

OTHER PUBLICATIONS

Lai Chen et.al., Self-healing property of focused circular Airy beams, <Optics Express>, vol. 28, No. 24, Nov. 17, 2020, pp. 36516-36526.
(Continued)

*Primary Examiner* — Bumsuk Won
*Assistant Examiner* — Grant A Gagnon

(57) ABSTRACT

The present application discloses a method and device for generating an Airy light needle with a long depth of focus and high aspect ratio. A linearly polarized light emitted from the laser passes through the collimated beam expanding system, and then is incident to the spatial light modulator loaded with a specific phase distribution for complex amplitude modulation. The first-order diffraction light passes through the iris and generates the modulated circular Airy beam at the back focal plane of the first 2-f lens system. The modulated circular Airy beam is focused to generate the Airy light needle with long depth of focus and high aspect ratio, which can be accurately controlled by controlling the parameters of the modulated circular Airy beams. The Airy light needle with adjustable depth of focus and aspect ratio can be applied to optical manipulation and optical imaging.

7 Claims, 9 Drawing Sheets

(51) Int. Cl.
   *G02B 27/28*          (2006.01)
   *G02F 1/13363*        (2006.01)
(52) U.S. Cl.
   CPC ..... *G02B 27/0927* (2013.01); *G02B 27/0944* (2013.01); *G02B 27/0955* (2013.01); *G02B 27/283* (2013.01); *G02F 1/133638* (2021.01)
(58) Field of Classification Search
   CPC .............. G02B 27/0955; G02B 27/283; G02F 1/133638
   USPC ....................................................... 359/237
   See application file for complete search history.

(56)                References Cited

FOREIGN PATENT DOCUMENTS

CN         114019690 A      2/2022
   CN         114406450 A      4/2022
   CN         116819788 A      9/2023

OTHER PUBLICATIONS

Lai Chen et.al., Experimental observation and manipulation of optical tornado waves, <Optics Letters>, vol. 47, No. 8, Apr. 14, 2022, pp. 2109-2112.
Peng Chen et.al., Steering the propagation of finite-energy Airy beam by spatial phase modulation, <Results in Physics>, Jan. 2, 2019, pp. 1-7.

* cited by examiner

METHOD AND DEVICE FOR GENERATING AIRY LIGHT NEEDLE WITH LONG DEPTH OF FOCUS AND HIGH ASPECT RATIO

CROSS-REFERENCE TO RELATED APPLICATIONS

This application claims priority to Chinese Patent Application No. 202211634135.4, filed on Dec. 19, 2022, the entire disclosures of which are incorporated herein by reference.

TECHNICAL FIELD

The present application relates to the field of optical technology, and specifically relates to a method and a device for generating an Airy light needle with a long depth of focus and a high aspect ratio.

BACKGROUND

The transverse distribution of the light beam evolves with propagation. The transverse full width at the half-maximal intensity of the beam is usually defined as the width of the focused light beam, and the axial full width at the half-maximal intensity of the beam along the propagation direction is defined as the depth of focus of the light beam, and the ratio of the depth of focus to the transverse width is called as the aspect ratio. A beam with large aspect (depth-to-width) ratio indicates that its width evolves slowly during propagation. The propagation properties of a Gaussian beam show that the depth of focus is related with the width of beam. Specifically, the Rayleigh distance $z_R = kw_0^2/2$ of the Gaussian beam decreases with the decrease of the waist radius wo, so that the depth of focus for a highly focused Gaussian beam is very short, which severely limits its working distance. However, optical imaging, laser direct writing, optical manipulation and other fields urgently need light fields with the long depth of focus and the high aspect ratio. The intensity profile of the light fields with long depth of focus and high aspect ratio presents slender needle shape, so called light needle. Light needles have a wide range of applications in optical manipulation and optical imaging. In optical manipulation, the trapping range of Gaussian beams is small, while the light needles with long depth of focus can increase the manipulation range on particles and even realize multiplanar trapping. Traditional three-dimensional imaging technology has a large limitation on the observer's observation distance and field of view, and the application of light needles to three-dimensional imaging can greatly extend the observer's observation distance and field of view.

Light needles can be generated by customized diffractive elements and structured light fields. Customized diffractive elements, such as multi-level diffractive lens, need to be specifically designed and fabricated, which is static and cannot be widely applied. Structural light fields can be flexibly controlled through the spatial light modulator to obtain a light field with a specific amplitude, phase, polarization distribution. And the structural light field with a long depth of focus, high aspect ratio can be well generated and controlled. Spatial light modulator is a device with wide applicability for dynamic modulation of light field, and it can realize real-time modulation of amplitude distribution, phase distribution and polarization distribution of light field by using specific algorithm. Compared with the customized diffractive elements, the use of spatial light modulator to generate the light field with a long depth of focus only need to load the phase distribution information through the computer to the spatial light modulator, with real-time adjustable, wide applicability and other advantages. Thus, it is a relatively fast and easy way to generate light needle.

Spatial light modulator is a dynamic modulation device on light fields, which uses the physical effects of liquid crystal molecules to modulate the amplitude, phase, polarization of the incident light field. The required picture information is loaded through the computer, which is easy to operate. Spatial light modulators can be categorized into three types: phase-only, amplitude-only, and amplitude-phase. Although the amplitude-phase spatial light modulator can simultaneously modulate the amplitude and phase of the incident light field, there is a coupling relationship between them, and it is a challenge to modulate the amplitude and phase of the incident light field independently. The phase-only spatial light modulator can modulate the phase of the incident light field with high precision. Currently, there are various algorithms that allow a phase-only spatial light modulator to indirectly modulate the amplitude and phase of the light field independently. The widely applied algorithms are optical grating diffraction algorithm [Applied Optics 38, 5004-5013 (1999)] and double-beam interferometry algorithm [Optics Letters 39, 1740-1743 (2014)]. The optical grating diffraction algorithm converts the amplitude and phase information of the light field into the phase-only information of the diffraction optical grating, and regenerates the amplitude and phase by the diffracted light of the optical grating. The double-beam interferometry algorithm decomposes the original light field into two pure-phase beams that be interferometrically superposed.

SUMMARY

The present application uses a spatial light modulator to generate an Airy light needle with long depth of focus and a high aspect ratio. The present application uses an optical grating diffraction algorithm to calculate the required phase distribution for complex amplitude modulation, which is loaded on a spatial light modulator for complex amplitude modulation. The modulated circular Airy beam generated by the present application is focused to generate an Airy light needle with long depth of focus and a high aspect ratio. The depth of focus and aspect ratio of the Airy light needle is controllable, the intensity distribution is uniform, the experimental scheme is simple, and the obtained Airy light needle with long depth of focus and a high aspect ratio has a wide range of applications in optical manipulation and optical imaging.

The purpose of the present application is realized by the following technical solutions.

According to the first aspect of the present application, it provides a method for generating an Airy light needle with long depth of focus and a high aspect ratio, wherein a desired phase distribution of a modulated circular Airy beam field is generable by a spatial light modulator, and an initial light field distribution of the loaded modulated circular Airy beam is expressed as:

$$E(r, z=0) = \sum_{n=1}^{N} A_n Ai\left(\frac{r_0 - r}{w}\right) \exp\left[\frac{a(r_1 - r)}{w}\right], \; r_n < r < r_n + \Delta_n \quad (1)$$

$$r_n = r_0 - wx_{0,n}, \; \Delta_n = w(x_{0,n} - x_{0,n+1}) \quad (2)$$

wherein $A_n$ is a n-th ring amplitude coefficient of the modulated circular Airy beam, Ai(•) denotes an Airy function, r is a radial coordinate of a cylindrical coordinate system, z is a propagation distance, $r_0$ is a radius of a main ring, w is a scaling factor; a is a decaying factor, N is the number of rings, and $r_n$ and $\Delta_n$ are a start radial coordinate and a width of the n-th ring of the modulated circular Airy beam, respectively, $x_{0,n}$ is a n-th zero point of the Airy function, where $x_{0,1} > 0 > x_{0,2} > \ldots > x_{0,n} > x_{0,n+1}$ are decreasing in sequence; the modulated circular Airy beam is to control a relative amplitude $A_n$ of each ring in the circular Airy beam individually, and then the modulated circular Airy beam is focused through a lens to generate the Airy light needle with the long depth of focus and the high aspect ratio.

In an embodiment, angular spectrum information of the modulated circular Airy beam is encoded into pure phase information of an optical grating, and the computed pure phase distribution is loaded onto a phase-only spatial light modulator to realize the complex amplitude modulation of the modulated circular Airy beam.

In an embodiment, the angular spectrum information is transformed by a 2-f lens system to obtain the modulated circular Airy beam; an angular spectrum $\tilde{E}$ of the modulated circular Airy beam field at the spatial light modulator is:

$$\tilde{E}(r') = -\frac{ik}{f}\exp(2ikf)\int_0^{+\infty} E(r, z=0) J_0\left(\frac{kr'r}{f}\right) r\, dr \quad (3)$$

where r' is a radial coordinate of a column coordinate system at the plane of the spatial light modulator, i is an imaginary unit, $k=2\pi/\lambda$ is a wavenumber, $\lambda$ is a wavelength, f is a focal length of the 2-f lens system, $J_0(\bullet)$ is a first type of zero-order Bessel function, equation (3) has no analytical solution and the numerical solution is found by substituting the equation (1) into the equation (3); the angular spectrum $\tilde{E}$ is mixed with amplitude and phase information, which is unable to directly loaded onto the phase-only spatial light modulator, and the amplitude and phase information of the angular spectrum $\tilde{E}$ is converted into the pure phase information of the optical grating by a optical grating diffraction algorithm; the amplitude and phase information of the angular spectrum of the modulated circular Airy beam is separated as $\tilde{E}=A\exp(i\varphi)$, and a phase distribution function of the optical grating loaded on the spatial light modulator is $T=\exp(iM\phi)$, wherein parameters M and $\phi$ meet following conditions: $\sin c[\pi(M-1)]=A$ and $\phi+\pi(M-1)=\varphi$; under this algorithm, first-order diffraction light in reflected light is the angular spectrum E of the modulated circular Airy beam, which is subsequently converted to the modulated circular Airy beam by the 2-f lens system to obtain the modulated circular Airy beam.

In an embodiment, the depth of focus and the aspect ratio of the generated Airy light needle are controlled by changing the parameters N and w.

In an embodiment, parameters $A_n$ need to be optimized under fixed parameters N and w to obtain a uniform central intensity distribution.

In an embodiment, when the parameter N increases, the depth of focus and the aspect ratio of the generated light needle increase; when the parameter N decreases, the depth of focus and the aspect ratio of the generated light needle decreases.

In an embodiment, the depth of focus and the aspect ratio of the generated light needle decreases when the parameter w increases; and the depth of focus and the aspect ratio of the generated light needle increases when the parameter w decreases.

According to the second aspect of the present application, it provides a device for generating an Airy light needle with long depth of focus and a high aspect ratio, including a laser, a collimated beam expanding system, a spatial light modulator, a 2-f lens system, and a light intensity distribution detector set up according to a scheme; a linearly polarized light emitted from the laser passes through the collimated beam expanding system, and then incidents to the spatial light modulator loaded with a specific phase distribution for complex amplitude modulation; the modulated beam is focused by the first 2-f lens system, and a first-order diffraction light is selected through an iris; a modulated circular Airy beam is generated at a back focal plane of the first lens; the modulated circular Airy beam is focused by the second 2-f lens system to generate the Airy light needle with the long depth of focus and the high aspect ratio, and then imaged on the light intensity distribution detector.

In an embodiment, the device includes a half-wave plate, a polarized beam splitter, and a group of confocal lenses in sequence set up according to the scheme;

the half-wave plate is fixed on a waveplate holder, and a direction of a fast axis of the half-wave plate is changed by rotating the waveplate holder to change the direction of polarization of emitted linearly polarized light; the polarized beam splitter separates the horizontally and vertically polarized components of the linearly polarized light, wherein transmitted light is horizontally polarized light and reflected light is vertically polarized light, and the beam splitting ratio of the transmitted light and the reflected light is related to the direction of polarization of the incident light; the combination of the half-wave plate and the polarized beam splitter is used to adjust an intensity and polarization of the transmitted light, and an intensity of the transmitted horizontally polarized light is changeable by rotating the half-wave plate; and the group of the confocal lenses is configured for laser collimation and expansion, and the size of the expanded beam matches a size of the liquid crystal panel of the spatial light modulator; the desired phase distribution information for generating the modulated circular Airy beam is loaded onto the spatial light modulator through a computer.

The benefits of the present application are:

(1) The generated Airy light needle has an ultra-long depth of focus with a large aspect ratio, and the depth of focus and aspect ratio are controllable. The depth of focus, aspect ratio, and intensity uniformity of the Airy light needle are much higher than other structured light fields. The generated Airy light needle can be applied to three-dimensional optical trapping of multiple particles and optical imaging.

(2) The optical path and setup are simple and can be widely applied.

BRIEF DESCRIPTION OF THE DRAWINGS

FIG. 1(a1),(b1),(c1),(d1) show the intensity profiles, and FIG. 1(a2),(b2),(c2),(d2) show the central intensity distributions of the focused light field. Here the incident power is 1 μW, r is the cross-sectional coordinate of the focused light field (i.e., the aforementioned radial coordinate), and z is the propagation distance from the initial plane of the generated modulated circular Airy beam to the observation plane.

FIG. 3(a1)-(c1) are the experimentally measured intensity profile, FIG. 3 (a2)-(c2) are the corresponding theoretical intensity profile, and FIG. 3 (a3)-(c3) are the central intensity distributions on the axis of the focused light field (the solid line here is the theoretical value, and the scattered dots are the experimentally measured values), where r is the cross-sectional coordinate of the focused light field (i.e., the aforementioned radial coordinate), and z is the propagation distance from the initial plane of the generated modulated circular Airy light field to the observation plane.

DETAILED DESCRIPTION OF THE EMBODIMENTS

In order to make the objects, technical solutions and advantages of the present application clearer and more understandable, the present application is described in further detail hereinafter in connection with embodiments. It should be understood that the specific embodiments described herein are only for explaining the present application and are not intended to limit the present application. Modifications or equivalent substitutions made by those skilled in the art on the basis of understanding the technical solution of the present application without departing from the scope of the technical solution of the present application shall be covered within the scope of the present application.

Figure 1:
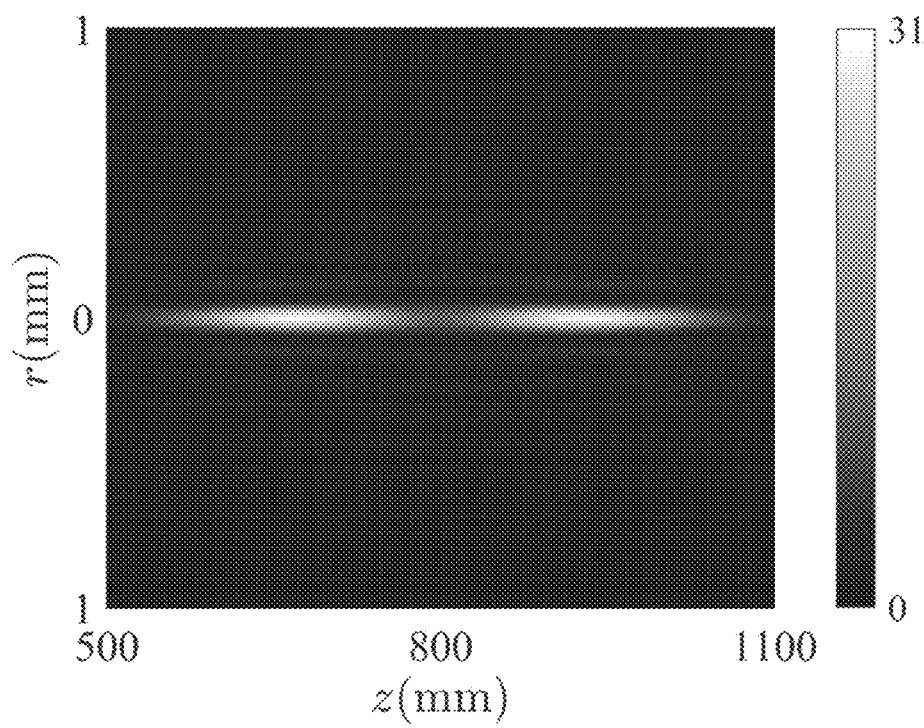
FIG. 1(a1)-(d2) show the theoretical intensity distributions under different parameters $A_n$ in the case of N=2 and w=0.08 mm. The parameters are $A_1=1$, $A_2=1$ in FIG. 1 (a1)-(a2); $A_1=1$, $A_2=0.5$ in FIG. 1 (b1)-(b2); $A_1=1$, $A_2=0.25$ in FIG. 1 (c1)-(c2); and $A_1=1$, $A_2=0.1$ in FIG. 1 (d1)-(d2).
Figure 1:
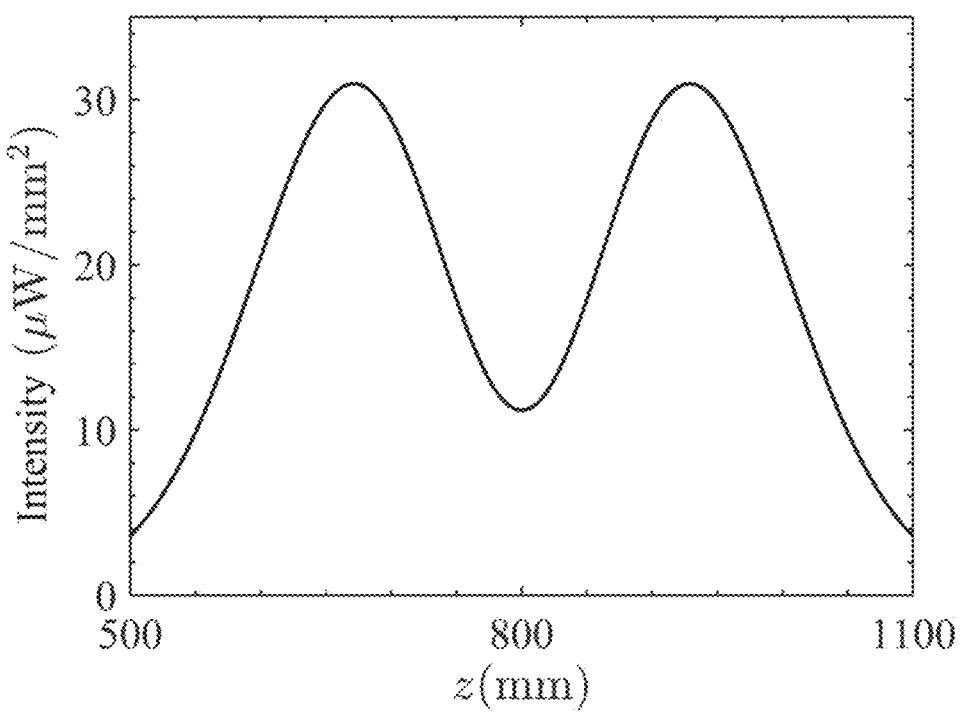
Figure 1:
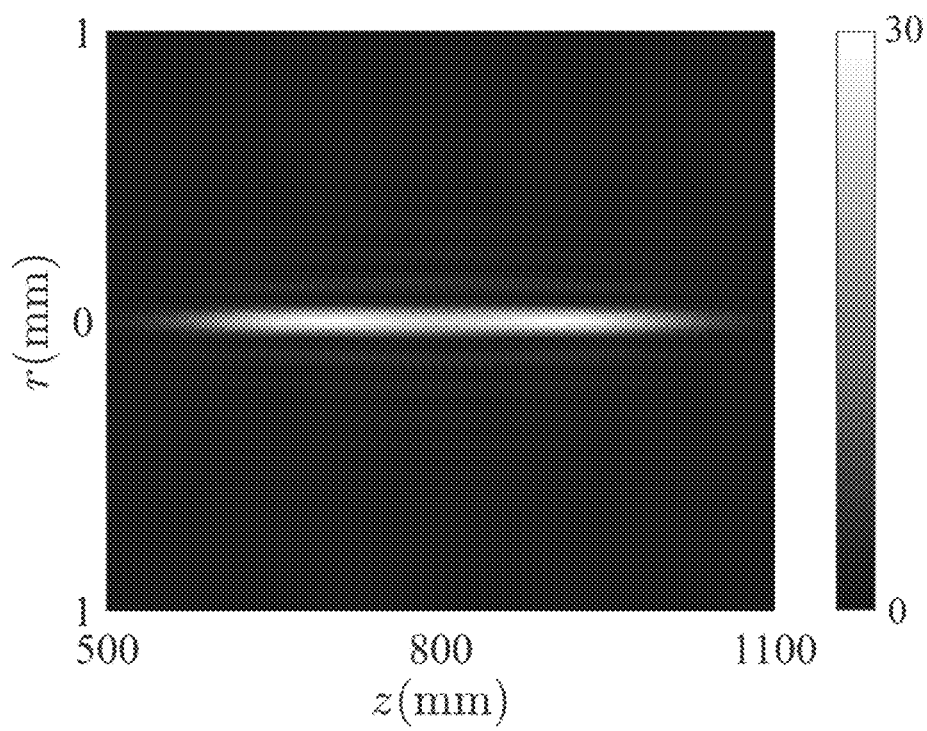
Figure 1:
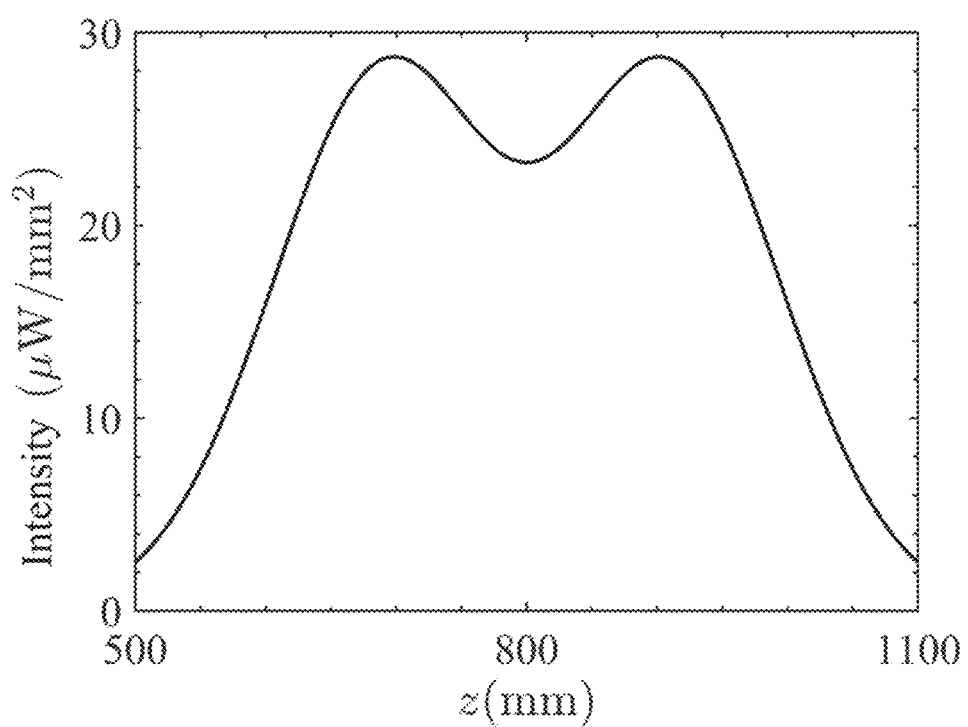
Figure 1:
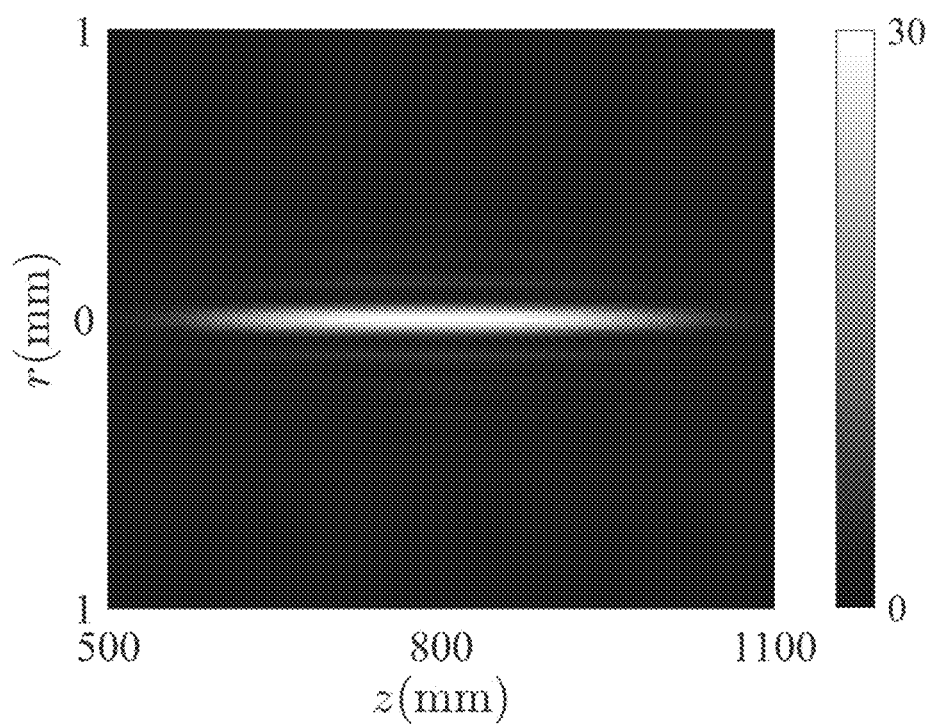
Figure 1:
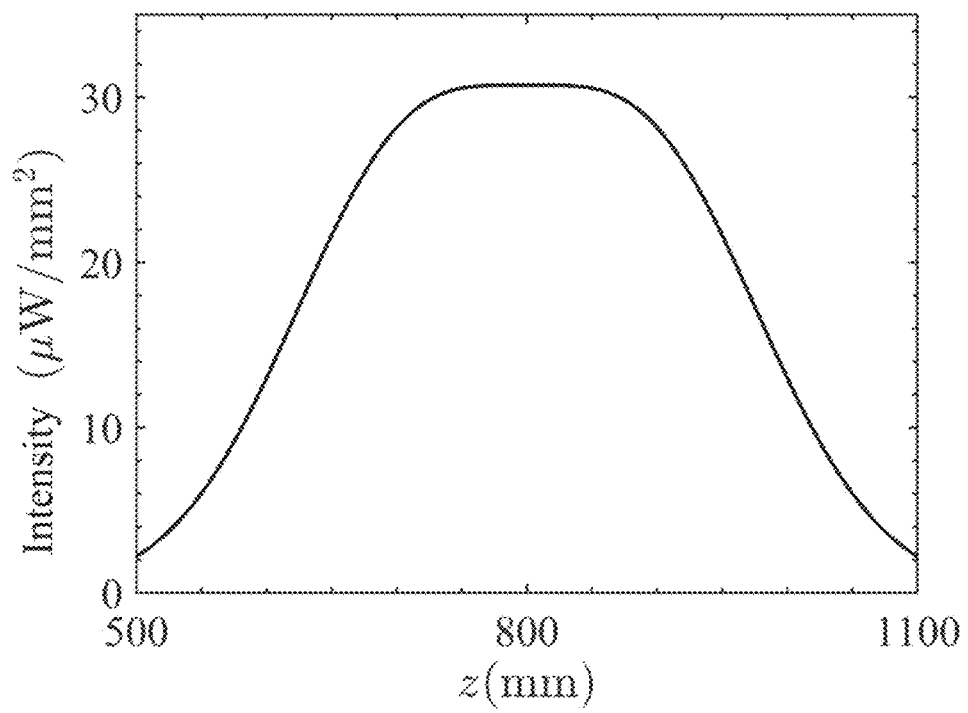
Figure 1:
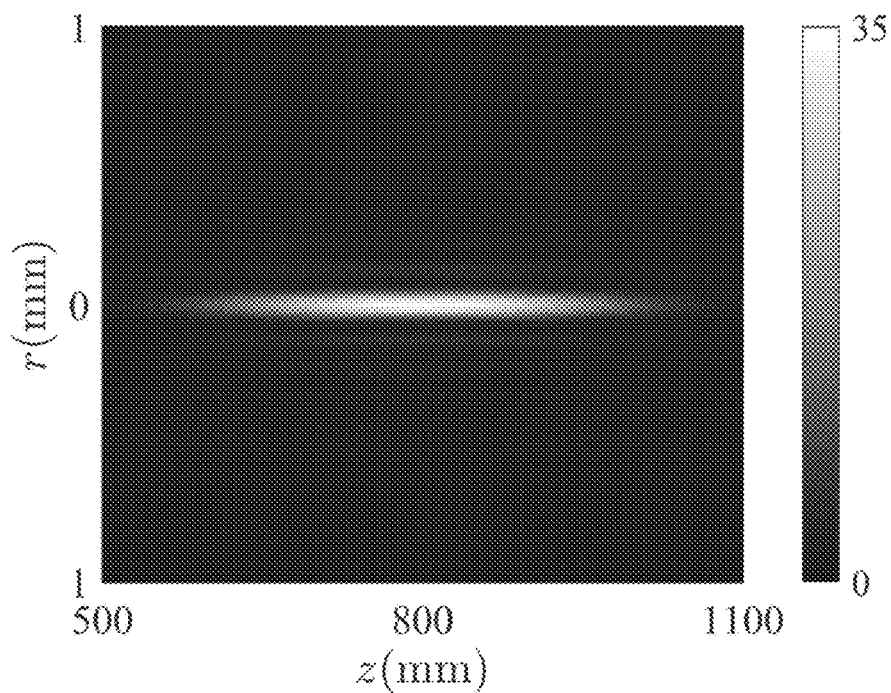
Figure 1:
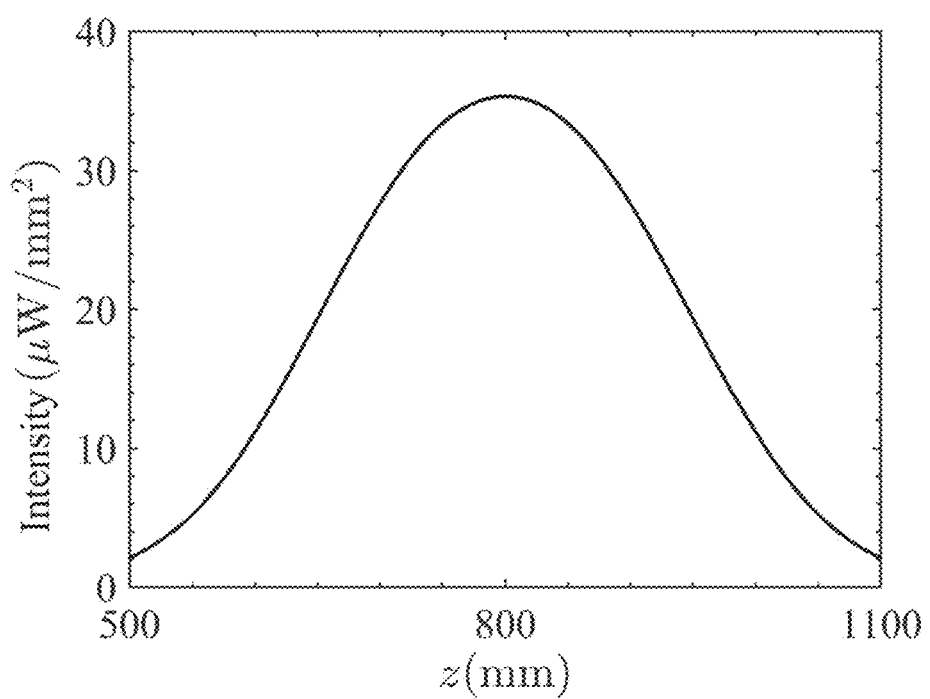

When the parameters N and w are determined, the value of the amplitude coefficient $A_n$ affects the central intensity distribution of the light field, which should be optimized to obtain a light needle with a uniform central intensity distribution. FIG. 1 shows the intensity distribution under different parameters $A_n$ on the light intensity distributions in the case of N=2, w=0.08 mm. The parameters are $A_1$=1, $A_2$=1 in FIG. 1 (a1)-(a2); $A_1$=1, $A_2$=0.5 in FIG. 1 (b1)-(b2); $A_1$=1, $A_2$=0.25 in FIG. 1 (c1)-(c2); and $A_1$=1, $A_2$=0.1 in FIG. 1 (d1)-(d2). FIG. 1(a1),(b1),(c1),(d1) are the theoretical intensity profiles, and FIG. 1(a2),(b2),(c2),(d2) are the central intensity distributions of the focused light fields. FIG. 1(a1)-(a2) show the intensity distribution of the modulated circular Airy beam when $A_n$ is not optimized. The center intensity shows a bimodal distribution and the central intensity is not uniform due to the strong interference between the primary and secondary rings of the modulated Airy beam. When the value of $A_2$ decreases, the uniformity of the center intensity increases, as shown in FIG. 1(b1)-(b2). When $A_2$ decreases to 0.25, the center intensity distribution becomes a uniform flat-top distribution, at this time the quality of the light needle is optimal, and the corresponding value of parameter $A_2$=0.25 is optimal, as shown in FIG. 1 (c1)-(c2). When the value of $A_2$ is smaller than the optimal value, the distribution of the center intensity is gradually single-peaked, and the uniformity of the intensity distribution decreases, as shown in FIG. 1(d1)-(d2). In summary, in the case of determining the parameters N=2 and w=0.08 mm, the optimal values of the amplitude coefficients $A_n$ are $A_1$=1 and $A_2$=0.25. In addition, the optimal values of the amplitude $A_n$ change with different parameters N and w. The values of $A_n$ still need to be optimized for other parameters N and w to obtain a uniform distribution of the central intensity.

Figure 2:
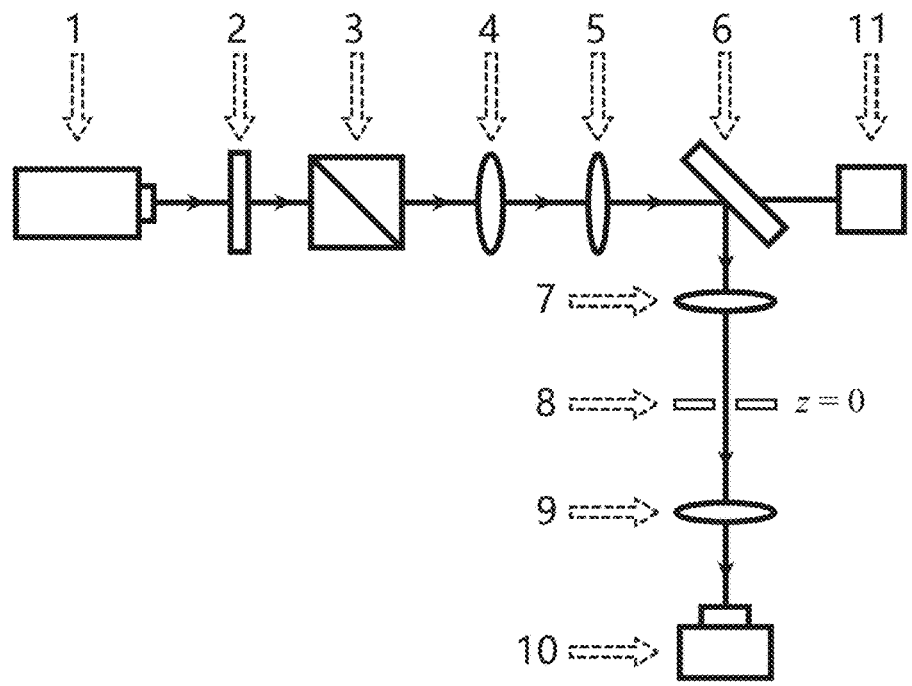
FIG. 2 shows the optical-path diagram for generating an Airy light needle with long depth of focus and high aspect ratio.

FIG. 2 shows an optical-path diagram of an embodiment of the present application. According to the optical path setup, it includes a laser 1, a half-wave plate 2, a polarized beam splitter 3, the first lens 4, the second lens 5, a spatial light modulator 6, the third lens 7, an iris 8, the fourth lens 9, a light intensity distribution detector 10, and a computer 11 connected to the spatial light modulator 6. The distance between the first lens 4 and the second lens 5 is equal to the sum of the focal lengths of the first lens 4 and the second lens 5. The distance between the spatial light modulator 6 and the third lens 7 is equal to the focal length of the third lens 7. The distance between the third lens 7 and the iris 8 is equal to the focal length of the third lens 7. The distance between the iris 8 and the fourth lens 9 is equal to the focal length of the fourth lens 9.

The laser 1 outputs a linearly polarized light and passes through a 532 nm half-wave plate 2. The half-wave plate 2 is fixed on a waveplate holder, and the direction of the fast axis of the half-wave plate 2 is changed by rotating the waveplate to change the direction of polarization of the linearly polarized light.

The polarized beam splitter 3 is used to separate the horizontally polarized component and the vertically polarized component of the linearly polarized light, where the transmitted light is horizontally polarized and the reflected light is vertically polarized. The beam splitting ratio of the transmitted light and the reflected light is related to the direction of polarization of the incident light. The intensity of the transmitted horizontally polarized light can be controlled by rotating the half-wave plate. The horizontally polarized transmitted light simultaneously meets the requirements of the polarization state of the light which incidents to the spatial light modulator.

The first lens 4 and the second lens 5 are combined as a group of confocal lenses, which is used for beam collimation and beam expansion, with 2 times of expansion rate. The horizontally polarized light incidents on a spatial light modulator 6 after being collimated and expanded, and the spatial light modulator 6 is connected to a computer 11. The phase distribution required for generating a modulated circular Airy field is loaded through the computer onto the spatial light modulator 6.

The third lens 7 is a 2-f lens system, and the reflected first-order diffraction light modulated by the spatial light modulator 6 generates the modulated circular Airy beam on the back focal plane of the third lens 7. The back focal plane of the third lens 7 is the initial plane of the modulated circular Airy beam. The iris 8 is placed on the back focal plane of the third lens 7 for selecting the first-order diffraction light. The modulated circular Airy beam is focused by the fourth lens 9 to generate an Airy light needle with a long depth of focus and a high aspect ratio, which is finally imaged on the light intensity distribution detector 10. The Airy light needles with a long depth of focus and high aspect ratio can be observed through the light intensity distribution detector 10.

The laser 1 in the following embodiment is a semiconductor laser with a wavelength of 532 nm, which is selected from Changchun Laser Optoelectronics Company, model number MW-GL-532/2000 mW.

Spatial light modulator 6 is Holoeye's PLUTO-2-NIR-015 model phase-only spatial light modulator, with modulation of light band of 650~1100 nm.

The light intensity distribution detector 10 is a CMOS camera from Tupelo Photonics, model U3CMOS14000KPA, with a camera chip of 5.73 mm×4.60 mm, a pixel size of 1.4 μm×1.4 μm, and a pixel depth of 12 bits.

The focal length of the first lens 4 is 150 mm, the focal length of the second lens 5 is 300 mm, the focal length of the third lens 7 is 400 mm, and the focal length of the forth lens 9 is 400 mm.

Embodiment 1

The laser 1 emits a 532 nm linearly polarized light beam, and the rotatable half-wave plate 2 can control the intensity of the horizontally polarized light passing through the polarized beam splitter 3. The first lens 4 and the second lens 5 are a group of confocal lens for beam collimation and expansion, and the width of the expanded light is about 5 mm, which matches the size of the liquid crystal panel of the spatial light modulator 6.

The expanded beam incidents to the spatial light modulator 6, and the spatial light modulator 6 is connected to the computer 11, which is loaded the required phase distribution for generating the modulated circular Airy beam.

The modulated circular Airy beam can be represented in the initial plane as:

$$E(r, z = 0) = \sum_{n=1}^{N} A_n Ai\left(\frac{r_0 - r}{w}\right) \exp\left[\frac{a(r_1 - r)}{w}\right], r_n < r < r_n + \Delta_n \quad (1)$$

$$r_n = r_0 - w x_{0,n}, \Delta_n = w(x_{0,n} - x_{0,n+1}) \quad (2)$$

wherein $A_n$ is the n-th ring amplitude coefficient of the modulated circular Airy beam, Ai(•) denotes the Airy function, r is the radial coordinate of the cylindrical coordinate system, z is the propagation distance, $r_0$ is the radius of the main ring, w is the scaling factor; a is the decaying factor, N is the number of rings, and $r_n$ and $\Delta_n$ are the start radial coordinate and the n-th ring width of the modulated circular Airy beam, respectively, $x_{0,n}$ is the nth zero point of the Airy function, where $x_{0,1} > 0 > x_{0,2} > \ldots > x_{0,n} > x_{0,n+1}$ are decreasing in sequence. The parameters are fixed: $r_0 = 1$ mm, a=0.05. The angular spectrum of the light is transformed into the pure phase distribution by optical grating diffraction algorithm, and the phase distribution corresponding to the equation (1) is loaded onto the spatial light modulator 6 through the computer 11 to realize the complex amplitude modulation of the light.

Figure 3:
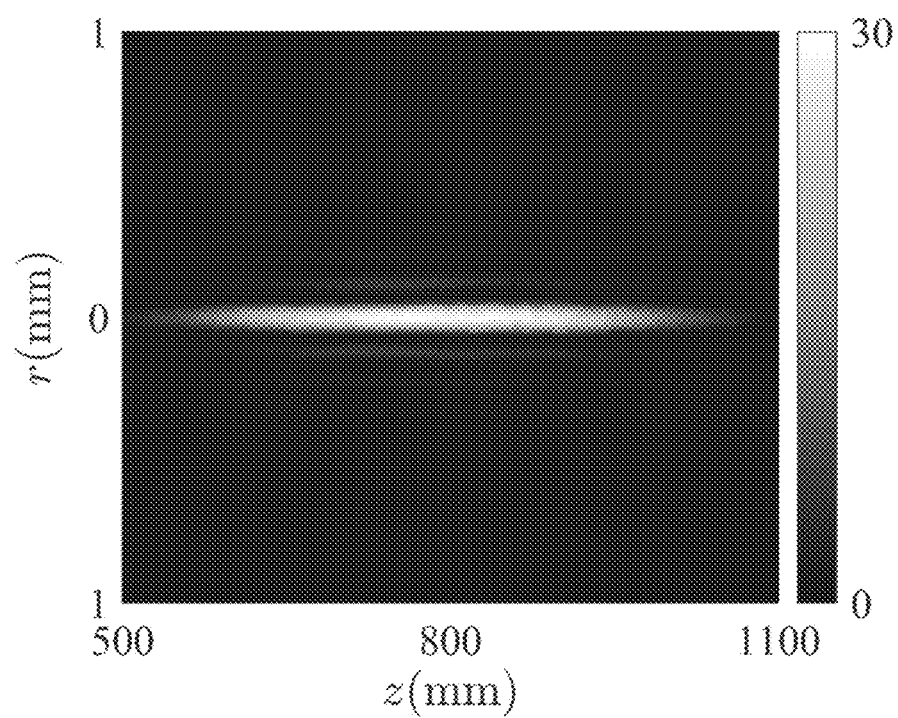
FIG. 3(a1)-(c3) show the intensity profiles and the evolution of the central intensity on the axis of the focused light field under different parameters N and w. Here the corresponding value of parameter $A_n$ has been optimized and the incident powers are all 1 μW. The parameters are N=2, w=0.08 mm, $A_1$=1, $A_2$=0.25 in FIG. 3 (a1)-(a3); N=5, w=0.08 mm, $A_1$=1, $A_2$=0.62, $A_3$=0.35, $A_4$=0.15, $A_5$=0.04 in FIG. 3(b1)-(b3); and N=5, w=0.10 mm, $A_1$=1, $A_2$=0.56, $A_3$=0.31, $A_4$=0.14, $A_5$=0.04 in FIG. 3 (c1)-(c3).
Figure 3:
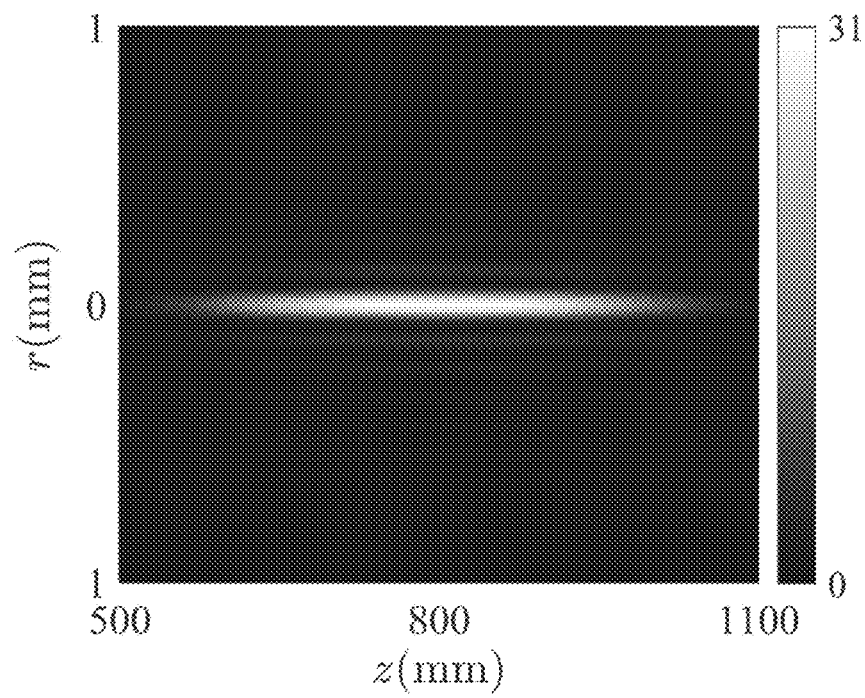
Figure 3:
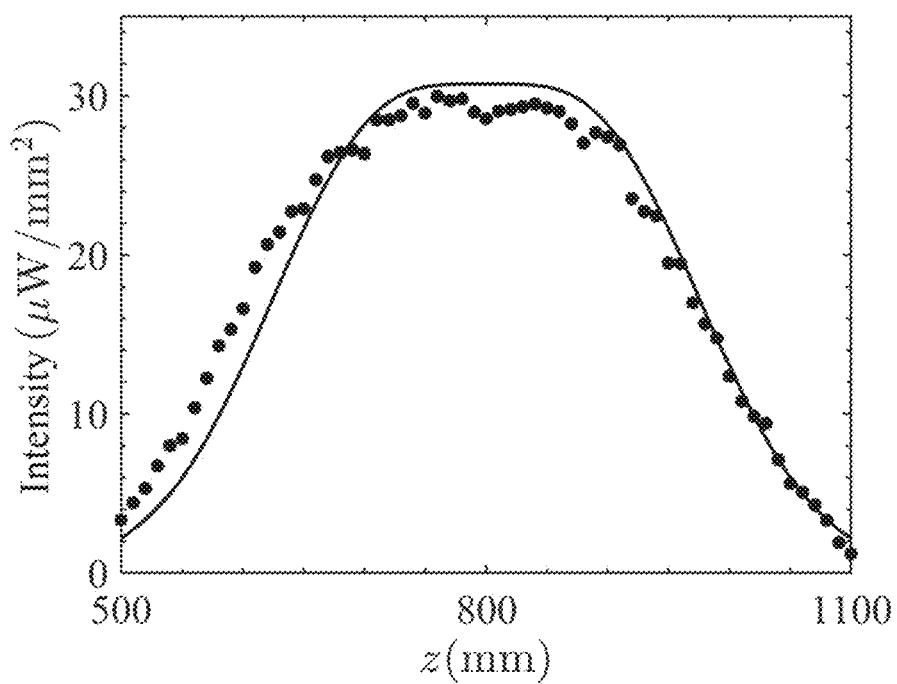
Figure 3:
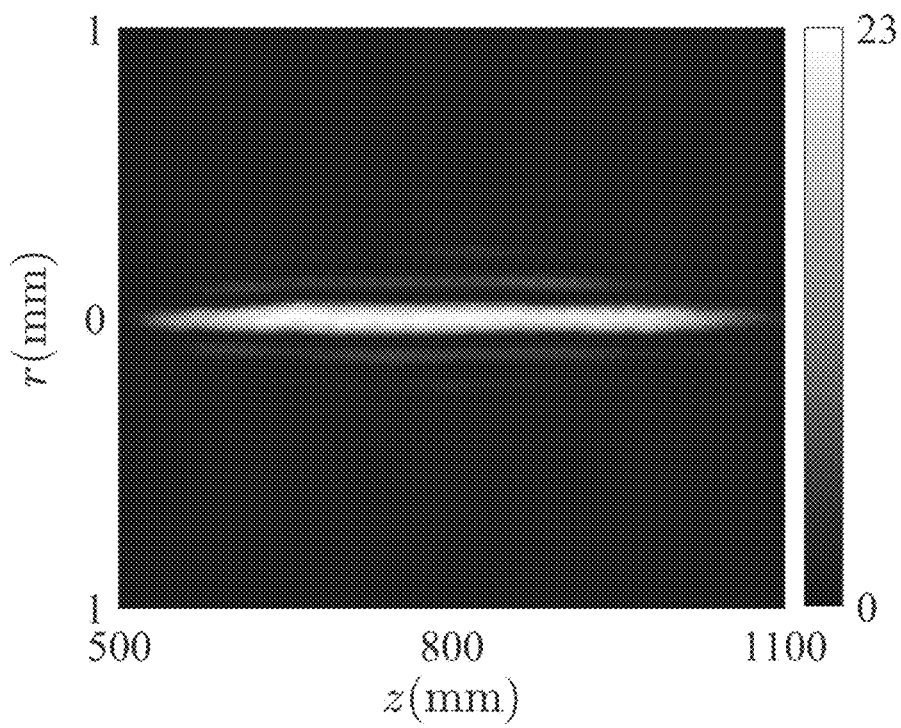
Figure 3:
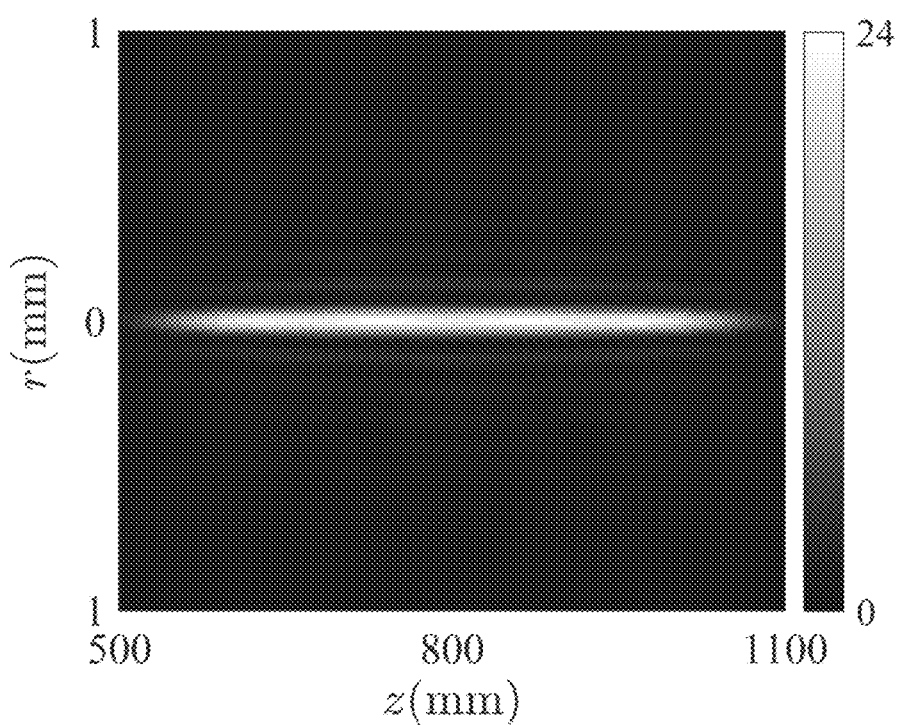
Figure 3:
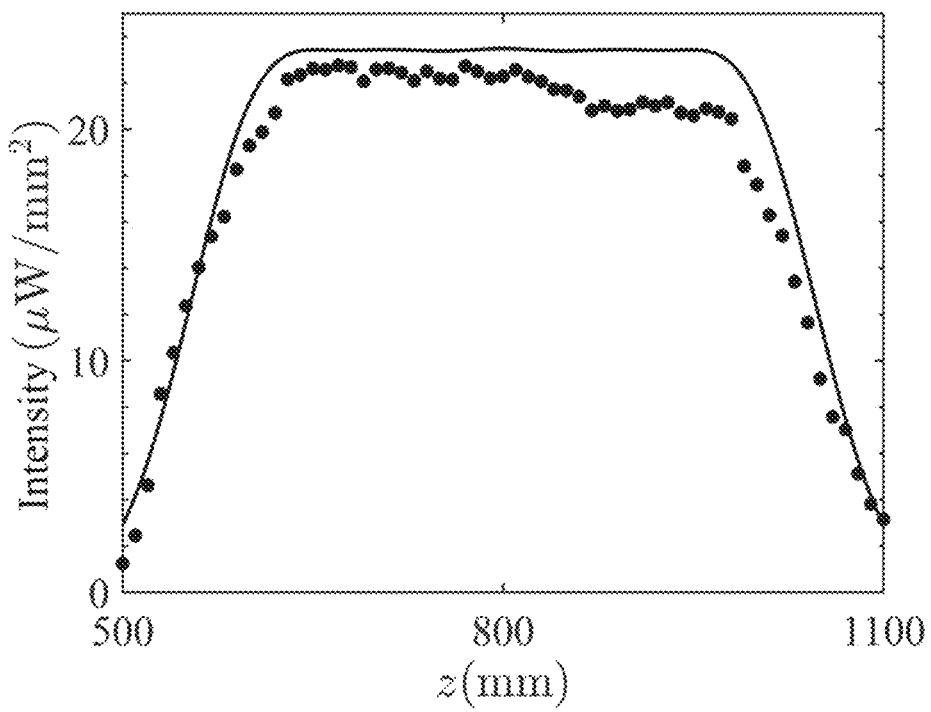
Figure 3:
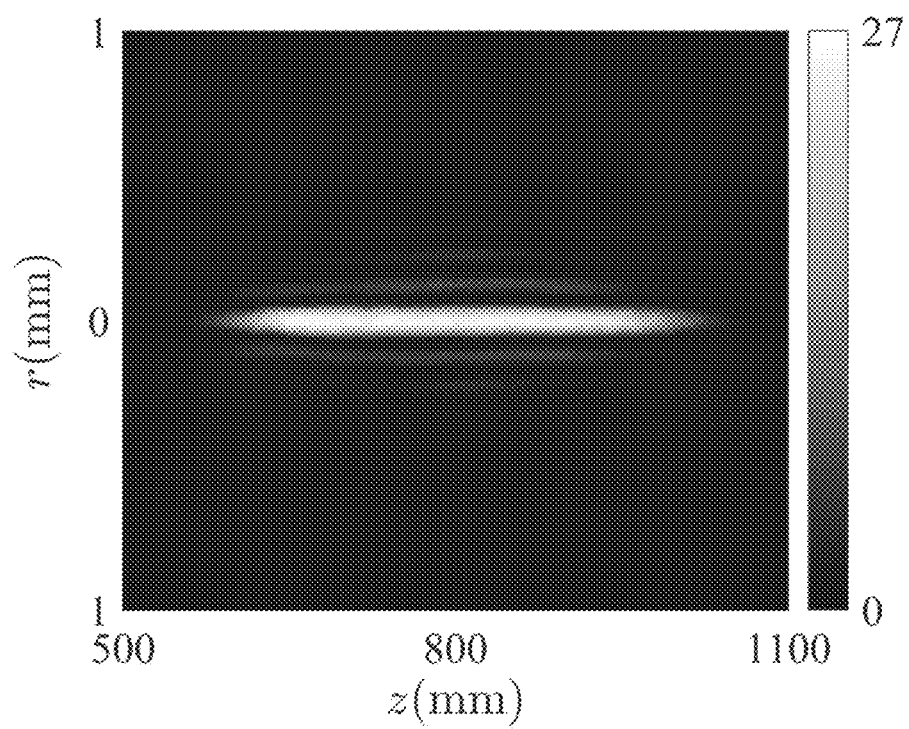
Figure 3:
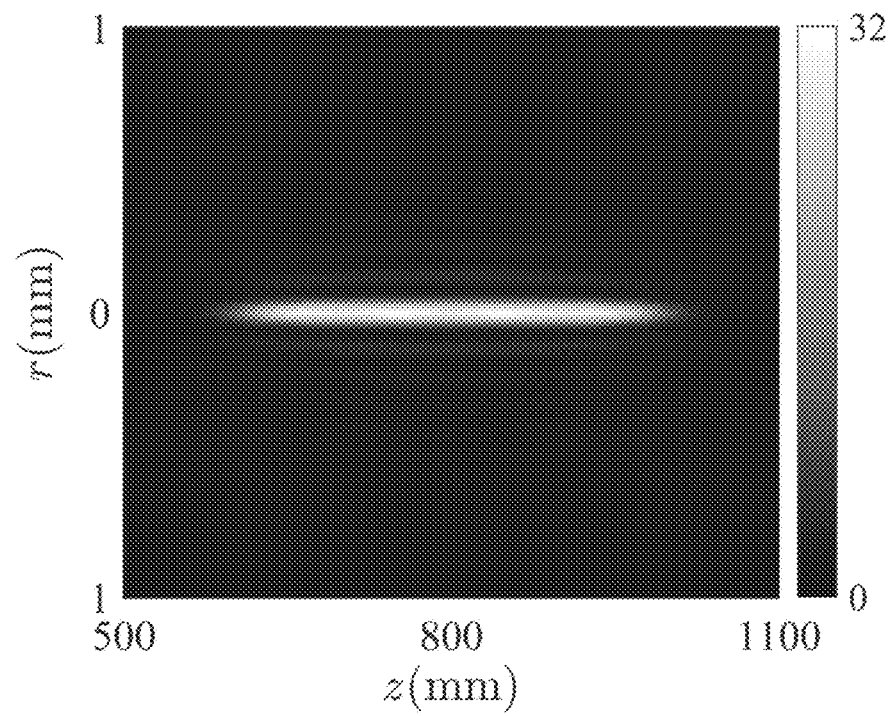
Figure 3:
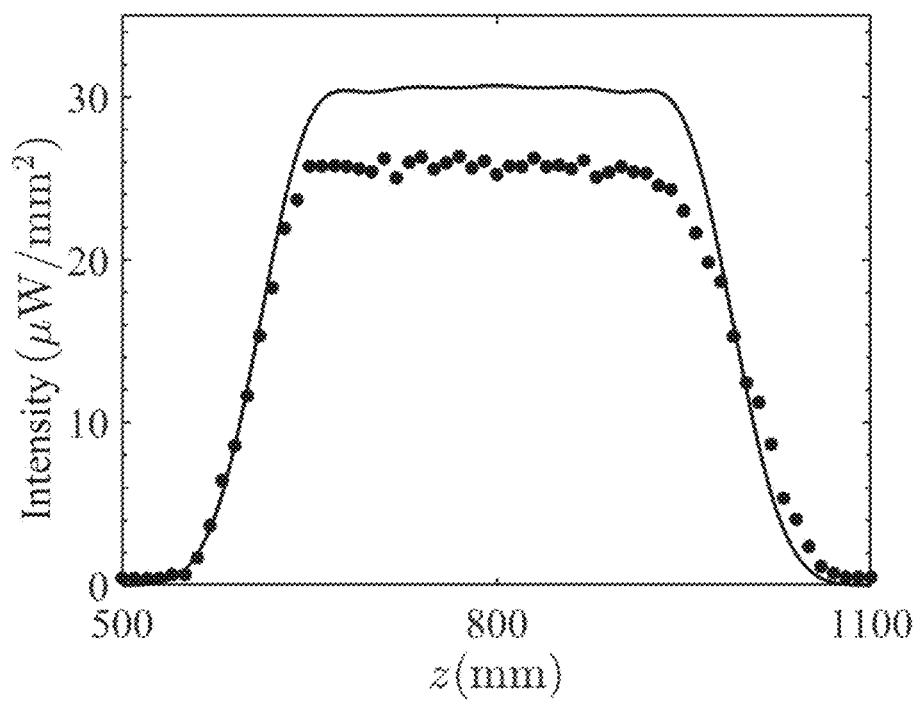

FIG. 3(a1)-(c3) shows intensity profile and central intensity distribution along the propagation direction of the Airy needle light with adjustable depth of focus and aspect ratio under different parameters, where the corresponding parameters are N=2, w=0.08 mm, $A_1$=1, $A_2$=0.25 in FIG. 3 (a1)-(a3); N=5, w=0.08 mm, $A_1$=1, $A_2$=0.62, $A_3$=0.35, $A_4$=0.15, $A_5$=0.04 in FIG. 3(b1)-(b3); and N=5, w=0.10 mm, $A_1$=1, $A_2$=0.56, $A_3$=0.31, $A_4$=0.14, $A_5$=0.04 in FIG. 3 (c1)-(c3); FIG. 3(a1),(b1),(c1) is the experimental intensity distributions, FIG. 3(a2), (b2), (c2) are the theoretical intensity distributions, and FIG. 3(a3),(b3),(c3) are the evolution of the central light intensity on the axis of the focused light field (the solid line here is the theoretical value, and the scatter is the experimental measured values). FIG. 3(a1)-(a3) show the corresponding experimentally measured depth of focus and aspect ratio are 390 mm and 4567, respectively. FIG. 3(b1)-(b3) show the corresponding experimentally measured depth of focus and aspect ratio are 500 mm and 5495, respectively. FIG. 3(c1)-(c3) show the corresponding experimentally measured depth of focus and aspect ratio are 400 mm and 4684, respectively. According to FIG. 3(a1)-(a3) and FIG. 3(b1)-(b3), it can be found that when the parameter N increases, the depth of focus and aspect ratio of the generated light needle will be increased. From FIG. 3(b1)-(b3) and FIG. 3(c1)-(c3), it can be found that when the parameter w increases, the depth of focus and the aspect ratio of the generated light needle decreases. The position of the lens' focus in this example is at z=800 mm. In summary, by adjusting the values of the parameters N and w, the depth of focus and the aspect ratio of the Airy light needle can be controlled.

The technical means disclosed in the scheme of the present application are not limited to the technical means disclosed in the above technical means, but also include technical solutions comprising equivalent substitutions of the above technical features. The unexhausted aspects of the present application belong to the common knowledge of those skilled in the art.

The invention claimed is:

1. A method for generating an Airy light needle with a long depth of focus and a high aspect ratio, wherein a desired phase distribution for generating a modulated circular Airy beam is loaded on a spatial light modulator, and an initial light field distribution of the loaded modulated circular Airy light is expressed as:

$$E(r, z = 0) = \sum_{n=1}^{N} A_n Ai\left(\frac{r_0 - r}{w}\right) \exp\left[\frac{a(r_1 - r)}{w}\right], r_n < r < r_n + \Delta_n \quad (1)$$

$$r_n = r_0 - w x_{0,n}, \Delta_n = w(x_{0,n} - x_{0,n+1}) \quad (2)$$

wherein $A_n$ is a n-th ring amplitude coefficient of the modulated circular Airy beam, Ai (•) denotes an Airy function, r is a radial coordinate of a cylindrical coordinate system, z is a propagation distance, $r_0$ is a radius of a main ring, w is a scaling factor; a is a decaying factor, N is the number of rings, and $r_n$ and $\Delta_n$ are a start radial coordinate and a width of the n-th ring of the modulated circular Airy beam, respectively, $x_{0,n}$ is a n-th zero point of the Airy function, where $x_{0,1} > 0 > x_{0,2} > \ldots > x_{0,n} > x_{0,n+1}$ are decreasing in sequence; the modulated circular Airy beam is to control a relative amplitude $A_n$ of each ring in the circular Airy beam individually, and then the modulated circular Airy beam is focused through a lens to generate the Airy light needle with the long depth of focus and the high aspect ratio.

2. The method for generating the Airy light needle with the long depth of focus and the high aspect ratio according to claim 1, wherein angular spectrum information of the modulated circular Airy beam is encoded into pure phase information of an optical grating, and the computed pure phase distribution is loaded onto a phase-only spatial light modulator to realize the complex amplitude modulation of the modulated circular Airy beam.

3. The method for generating the Airy light needle with the long depth of focus and the high aspect ratio according to claim 2, wherein the angular spectrum information is transformed by a 2-f lens system to obtain the modulated circular Airy beam; an angular spectrum E of the modulated circular Airy beam at a plane of the spatial light modulator is:

$$\tilde{E}(r') = -\frac{ik}{f}\exp(2ikf)\int_0^{+\infty} E(r, z=0)J_0\left(\frac{kr'r}{f}\right)rdr \quad (3)$$

where r' is a radial coordinate of a column coordinate system at the plane of the spatial light modulator, i is an imaginary unit, $k=2\pi/\lambda$ is a wavenumber, $\lambda$ is a wavelength, f is a focal length of the 2-flens system, $J_0$ (•) is a first type of zero-order Bessel function, equation (3) has no analytical solution and the numerical solution is found by substituting the equation (1) into the equation (3); the angular spectrum $\tilde{E}$ is mixed with amplitude and phase information, which is unable to directly loaded onto the phase-only spatial light modulator, and the amplitude and phase information of the angular spectrum $\tilde{E}$ is converted into the pure phase information of the optical grating by a optical grating diffraction algorithm; the amplitude and phase information of the angular spectrum of the modulated circular Airy beam is separated as $\tilde{E}=A \exp(i\varphi)$, and a phase distribution function of the optical grating loaded on the spatial light modulator is $T=\exp(iM\phi)$, wherein parameters M and $\phi$ meet following conditions: sinc $[\pi(M-1)]=A$ and $\phi+\pi(M-1)=\varphi$; under this algorithm, a first-order diffraction light in reflected light is the angular spectrum $\tilde{E}$ of the modulated circular Airy beam, which is subsequently converted to the modulated circular Airy beam by the 2-f lens system to obtain the modulated circular Airy beam.

4. The method for generating the Airy light needle with the long depth of focus and the high aspect ratio according to claim 1, wherein the depth of focus and the aspect ratio of the generated Airy light needle are controlled by changing the parameters N and w.

5. The method for generating the Airy light needle with the long depth of focus and the high aspect ratio according to claim 4, wherein parameters $A_n$ need to be optimized under fixed parameters N and w to obtain a uniform central light intensity distribution.

6. The method for generating the Airy light needle with the long depth of focus and the high aspect ratio according to claim 4, wherein when the parameter N increases, the depth of focus and the aspect ratio of the generated light needle increase, and the depth of focus and the aspect ratio of the generated light needle decrease when the parameter N decreases.

7. The method for generating the Airy light needle with the long depth of focus and the high aspect ratio according to claim 4, the depth of focus and the aspect ratio of the generated light needle decreases when the parameter w increases; and the depth of focus and the aspect ratio of the generated light needle increases when the parameter w decreases.

* * * * *